United States Patent Office
2,860,991
Patented Nov. 18, 1958

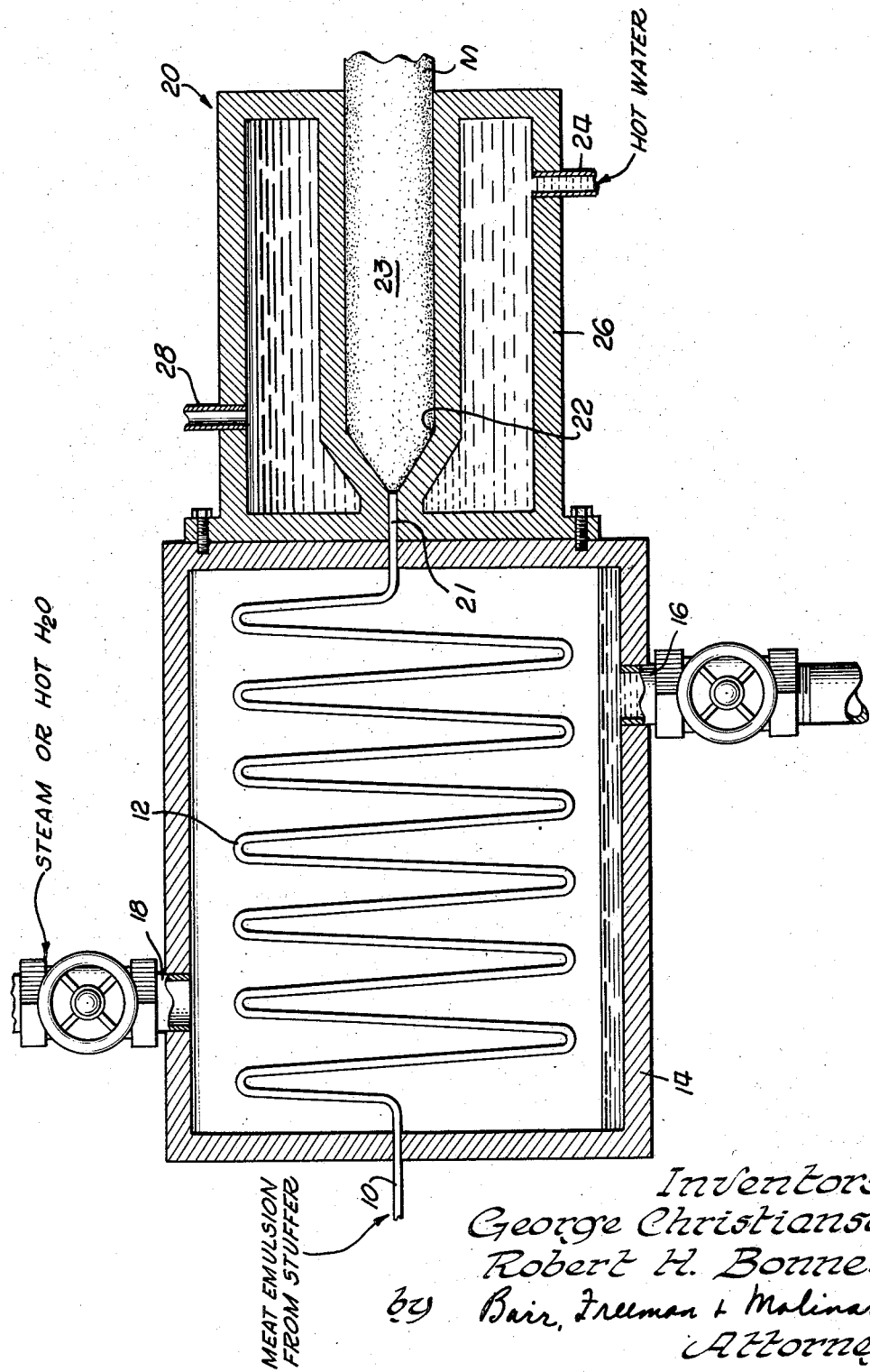

2,860,991

METHOD FOR PREPARING MEAT PRODUCTS

George Christianson, Waterloo, Iowa, and Robert H. Bonner, Chicago, Ill., assignors to The Rath Packing Company, Waterloo, Iowa, a corporation of Iowa Application February 7, 1955, Serial No. 486,333

6 Claims. (Cl. 99—109)

This invention relates to a method for processing meat products, and more particularly to a method for making shaped meat products from a comminuted meat emulsion.

The conventional method for manufacturing shaped meat products, such as sausages, involves a considerable amount of labor which constitutes approximately half the cost of the finished product in the case of frankfurters. Sausages of this type are prepared by finely chopping a mixture of meats and other ingredients into an emulsion, stuffing the raw meat emulsion into artificial casings, tying off the casings into links, hanging the sausage links on racks, and heating and smoking them in the smoke house. After the sausages are smoked and cooked they are then dyed and the casing is peeled off and thrown away. It is apparent that all of these handling operations add considerably to the cost of the product and are also responsible for appreciable bacteriological contamination. In producing natural casing sausages the cost is somewhat greater because the meat is stuffed into sheep casings which are more expensive than the artificial casings because of the labor involved in cleaning and purifying them.

This invention is directed to a method for preparing shaped comminuted meat products which requires no casings for imparting shape to the meat. The method includes the steps of preheating the comminuted meat emulsion to a maximum temperature within the protein-coagulation time-temperature range and then immediately shaping the heated meat to the desired size and form so that coagulation of the protein takes place after shaping. The shaped meat, after coagulation, is "set up," that is, it is self-supporting and requires no confining skin or the like to hold its shape. It is sufficiently stable to be handled for subsequent processing and packaging.

It has been proposed previously to mold sausage meat by forcing the raw meat emulsion into a mold, or through a die, and heating the mold or die to coagulate the protein, thus setting up the meat. In such a process heat reaches the center of the meat product by conduction through the walls of the mold and through the meat itself. Because the heat transfer is relatively slow, the process is impractical economically because of the large mold investment required to produce commercial quantities of sausage. If the mold temperature is raised to increase the rate of coagulation and accelerate the process, the outside surface of the meat will scorch or burn.

It has also been proposed to coagulate sausage emulsion by electrical means which does not depend upon conductivity of the heat through the sausage. This method is efficient in heating the meat completely through in a short period of time, but the apparatus involved is expensive and the molds must be made from dielectric material, or else the sausage must be stuffed into skins prior to heating and coagulating. Dielectric heating has also been found to result in non-uniform heating because of the heterogeneous nature of the sausage emulsion.

It is an object of the present invention to obviate the difficulties encountered in these previous methods and provide a method for producing skinless shaped meat products at a rapid rate.

Another object of the invention is to provide a process for producing sausages without utilizing any casing.

A further object is to provide a method for producing a coagulated meat product having a much lower bacteriological count than similar products made by conventional methods.

These and other objects will become apparent from the specification when read in conjunction with the accompanying drawing, which consists of a single figure and illustrates diagrammatically one form of apparatus for practicing the process of the invention.

It is well known that proteins, including the proteins in meat, will require a period of time to coagulate which varies with the temperature employed. In meat processing it has been found that the preferred range of coagulating temperatures, which runs from 130° F. to 170° F., will require times ranging from ½ minute to .035 minute for coagulating the protein. The time is a logarithmic function of the temperature. The times required to coagulate a representative sausage composition at various temperatures are set forth in the table below:

| Temperature, ° F.: | Time, min. |
|---|---|
| 130 | .5 |
| 135 | .25 |
| 140 | .20 |
| 145 | .165 |
| 150 | .135 |
| 155 | .125 |
| 160 | .080 |
| 165 | .065 |
| 170 | .035 |

It will be understood, of course, that the time-temperature correlation will vary with the type and quantity of ingredients (e. g. salt, sugar) comprising the meat composition.

The novelty in this invention lies in heating the raw meat emulsion very rapidly to bring the temperature thereof to a temperature within the coagulation range and then discharging the preheated meat emulsion into a mold immediately, that is, within 1% of the time required to complete coagulation at that particular temperature. For example, if a meat emulsion following the time-temperature correlation in the table above, were preheated to a selected temperature of 145° F., it must be discharged into the mold within .0016 minute after it has attained the temperature of 145° F. The reason why the time is so critical is because the coagulation process follows a negative log curve, i. e. the greatest amount of coagulation takes place in the first time interval; successively lesser amounts of coagulation occur in each succeeding time interval. The meat is then permitted to remain in the mold, which, of course, determines its final size and shape, until coagulation has been substantially completed. In other words, as a practical matter, substantially all coagulation occurs within the mold or forming means. The product cannot be properly shaped after coagulation has occurred. It contains lumps, is somewhat gritty, and will not cohere well. The amount of heat added to the mold preferably is only that required to make up heat losses due to radiation and conduction through the walls of the mold itself. The mass of meat is not heated after reaching the mold. Thus, the meat emulsion reaches its highest temperature (the selected temperature in the protein-coagulating range) at a point just prior to being discharged into the mold. Consequently, no burning or scorching of the meat occurs during coagulation, although the mold temperature may be high enough to form a skin on the outer surface. Upon removal from the mold, the shaped meat is completely set up and will retain the shape imparted thereto by the mold. The sausage may then be smoked or further cooked, in accordance with conventional procedure.

In carrying out the invention any conventional type of heat exchanger may be employed which is capable of heating the meat very rapidly to coagulation temperature. For example, we have found that a votator is very satisfactory for this purpose. A votator comprises an elongated jacketed tube having an axial shaft, carrying fingers or blades, which rotates within the tube to mix the material therein and promote efficient heat transfer from the walls of the tube to the material passing therethrough. A steam jacketed votator will bring the temperature of the meat up to the coagulation point very rapidly without scorching or burning. Another form of heat exchanger consists of a thin metal tube of highly conductive metal through which the meat may flow at a very rapid rate. The tube may be enclosed in air maintained at the desired temperature, or in hot water, or steam. By keeping the meat moving rapidly, over-heating is prevented. By employing a very small diameter tube the heat transfer to the center of the meat requires a minimum time. The meat emulsion may also be heated prior to coagulation by introducing live pressurized steam directly into the meat. This may be done by providing a tube having a Y-fitting at one end. The meat enters the tube through one leg of the Y, and the steam through the other leg. The force and speed of the flowing steam carries the meat along due to a Venturi effect and promotes a uniform mixture of the steam and meat. For large bulk items, such as bologna or any sliced meat, a plate-type heat exchanger may be used. Regardless of the means employed for heating, it is essential that coagulation does not occur in the heat exchanger.

The shaping means in which the meat is formed is connected directly to the end of the heat exchanger. The amount of time required for the meat emulsion to pass through the heat exchanger is very carefully controlled so that after the meat reaches a maximum predetermined temperature in the protein-coagulation time-temperature range, it does not remain therein over 1% of the total time required for coagulation at that particular temperature. If the time in the heat exchanger exceeds this period, it will be difficult to shape to its final form because coagulated lumps are produced which cohere poorly and cause non-homogeneity. It is essential that substantially all of the coagulation which occurs in converting the meat emulsion to a solid state take place within the mold where the meat is confined to its final shape. The mold may be a conventional injection-type mold used for shaping plastic masses having an orifice in one end through which the meat is discharged into multiple cavities. The molded products may be removed by a blast of compressed air introduced through orifices connecting to the cavities. The shaping means may also take the form of an elongated tubular die of desired cross-sectional configuration. In such case, the meat may move continuously through the tubular die while coagulation is taking place. The shape, of course, is not changed during coagulation. The die should be long enough so that substantially all of the coagulation has occurred before the meat emerges from the end thereof. When using an extrusion die of this type the sausages may be cut in appropriate lengths from the continuous extrusion emerging from the die. A slicer may be placed at the end of the die for this purpose.

The shaping means may be made from stainless steel which has been polished to a mirror-like finish, or from metal which is lined with glass, porcelain, heat stable resins such as polyfluoroethylene, or other suitable material. If necessary, the mold should be supplied with a heat source so that the temperature of the walls of the cavity do not fall below the particular coagulation temperature which the meat has attained in passing through the heat exchanger.

Referring now to the drawing, meat from conventional stuffers, or high pressure piston-type extruders, is forced continuously into the highly conductive tubing 10 which is shaped in the form of a coil 12. The coil 12 is completely enclosed in a housing 14 through which hot water or steam may be circulated by means of inlet tube 18 and outlet tube 16. The coil 12 connects to the orifice 21 in the end of the cavity 23 of die 20 which imparts the desired cross-sectional shape to the meat product which, in this case, is round. The die 20 has a jacket 26 through which hot water may be circulated by means of conduits 24 and 28. The temperature of the walls of cavity 23 is preferably maintained at a temperature not higher than the temperature of the meat entering the die. Only where it is desired to impart a "shell" or skin to the meat product does the mold temperature exceed the entering temperature, and then not more than 5° to 10° F. The rate at which the meat is forced through the tube 12 is adjusted so that the maximum desired temperature within the protein-coagulating range is reached just before the meat enters the shaping mold or die 20. It will be noted that the coil 12 is of much smaller diameter than the cavity of the die 20. This permits the meat to be heated very rapidly. For example, the diameter of tube 12 may be in the range of $\frac{1}{16}''$ to $\frac{1}{8}''$, while the cavity 23 has a diameter of about $\frac{3}{4}''$. The length of the die is calculated to permit the meat to coagulate completely before it emerges from the end thereof. The extruded and coagulated meat product M may be cut off in segments of any desired length.

In preparing sausage from conventional frankfurter meat emulsion in this apparatus the length of time required for the emulsion to pass through tube 12 was 0.015 minute with the temperature at 145° F. The emulsion is advanced through the tube 12 at the rate of 10 to 12 cubic feet per minute, which is equivalent to a speed of about one thousand linear feet per minute. The sausage emerging from the mold which was also maintained at approximately 145° F. was of fine uniform texture and completely set up. It was sliced off in segments of suitable length by a slicer (not shown) mounted at the end of the die 20.

It will be understood that the apparatus shown in the drawing is merely for purposes of illustration and it is not intended that the method be limited to the illustration. Other means may be employed for practicing the process of the invention as indicated previously in the specification. This method is suitable for preparing a large variety of meat products regardless of the final size or shape they might take. In addition to conventional sausages such as frankfurters or Vienna sausage, the process is adaptable for making bologna and bologna emulsion-base meats like pickle-pimento loaf, salami, meat loaf, pork pepper loaf, pork sausage, New England sausage, Braunschweiger, and similar products, which contain comminuted meat and which depend upon the coagulation of the protein to convert the fluid mass to apparent solid.

What we claim as new and desire to secure by Letters Patent of the United States is:

1. A method of preparing a shaped meat product from heat coagulable comminuted meat which comprises uniformly heating said meat to a selected coagulating temperature within the range of 130°–170° F., shaping the heated meat to desired form immediately upon attaining said selected coagulating temperature, and causing the shaped meat to coagulate within a time period within the range of 0.5 to .035 minute, while maintaining said selected coagulating temperature.

2. The method of claim 1 wherein said shaping step is completed within 1% of the time required to coagulate said meat at said selected temperature.

3. The method of claim 1 wherein said coagulating step is effected at a temperature between said selected temperature and 10° above said selected temperature.

4. The method of claim 1 wherein said heating step is accomplished by injecting steam into said meat.

5. The method of claim 1 wherein said meat is agitated during the time required to heat said meat to said selected coagulating temperature.

6. A method of preparing a shaped meat product from heat-coagulable comminuted meat which comprises quickly elevating the temperature of said meat to a selected coagulating temperature within the range of 130° to 170° F., extruding said heated meat immediately upon attaining said selected coagulating temperature to shape the meat, and causing the shaped meat to coagulate within a time period within the range of 0.5 to .035 minute, while maintaining said selected coagulating temperature.

References Cited in the file of this patent

UNITED STATES PATENTS

| | | |
|---|---|---|
| 1,009,953 | Boyle | Nov. 28, 1911 |
| 2,182,211 | Paddock | Dec. 5, 1939 |
| 2,685,518 | Prohaska | Aug. 3, 1954 |